(12) United States Patent
Zhang et al.

(10) Patent No.: US 11,403,446 B1
(45) Date of Patent: Aug. 2, 2022

(54) METHOD, SYSTEM AND APPARATUS FOR PREDICTING RESIDUAL STRENGTH OF COMPOSITE MATERIAL AFTER IMPACT, AND MEDIUM

(71) Applicant: Guangzhou University, Guangzhou (CN)

(72) Inventors: Zhifang Zhang, Guangzhou (CN); Jingwen Pan, Guangzhou (CN); Jiyang Fu, Guangzhou (CN); Airong Liu, Guangzhou (CN); Jiurong Wu, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 17/471,769

(22) Filed: Sep. 10, 2021

(30) Foreign Application Priority Data

May 19, 2021 (CN) .......................... 202110546089.1

(51) Int. Cl.
*G06F 16/18* (2019.01)
*G06F 30/27* (2020.01)

(52) U.S. Cl.
CPC .................................. *G06F 30/27* (2020.01)

(58) Field of Classification Search
CPC ....................................................... G06F 30/27
USPC ........................................................... 706/21
See application file for complete search history.

(56) References Cited

U.S. PATENT DOCUMENTS

| 5,561,173 | A | * | 10/1996 | Dry | A61L 27/48 428/320.2 |
| 5,660,624 | A | * | 8/1997 | Dry | A61L 27/48 106/676 |
| 5,910,456 | A | * | 6/1999 | Matsuhisa | C08J 5/042 442/179 |
| 5,989,334 | A | * | 11/1999 | Dry | A61L 27/48 106/677 |
| 6,261,360 | B1 | * | 7/2001 | Dry | A61L 27/48 106/676 |
| 6,527,849 | B2 | * | 3/2003 | Dry | B32B 5/02 106/677 |
| 7,022,179 | B1 | * | 4/2006 | Dry | A61L 27/48 106/677 |
| 7,561,976 | B2 | * | 7/2009 | Bernard | G01M 5/0041 702/42 |
| 7,630,871 | B2 | * | 12/2009 | Cole | G06F 30/23 703/8 |

(Continued)

*Primary Examiner* — Khai N. Nguyen
(74) *Attorney, Agent, or Firm* — Getech Law LLC; Jun Ye

(57) ABSTRACT

The invention discloses a method for predicting a residual strength of a composite material after impact. The method includes: acquiring a first frequency value of a composite material to be tested after impact damage; determining a first frequency change rate according to an initial frequency value and the first frequency value of the composite material to be tested; inputting the first frequency change rate to a pre-constructed residual strength prediction model to predict a first residual strength of the composite material to be tested; the first frequency value and the initial frequency value being obtained by a modal test. Further, residual strength prediction may be performed on the composite material in service, the position and the size of impact damage, the impact energy, the shape and quality of the impact object are not required to be determined, which avoids a rigidity test of the composite material in service.

8 Claims, 2 Drawing Sheets

(56) References Cited

U.S. PATENT DOCUMENTS

| | | | | |
|---|---|---|---|---|
| 8,338,535 B2* | 12/2012 | Sakata | | C08J 5/24 |
| | | | | 525/92 H |
| 9,534,993 B2* | 1/2017 | Bond | | G01M 5/0033 |
| 10,557,001 B2* | 2/2020 | Aerts | | C08J 5/24 |
| 10,953,608 B2* | 3/2021 | Jahanbin | | B29C 66/112 |
| 11,009,863 B2* | 5/2021 | Bharadwaj | | G05B 19/4099 |
| 2001/0050032 A1* | 12/2001 | Dry | | C04B 35/80 |
| | | | | 106/677 |
| 2006/0004550 A1* | 1/2006 | Coles | | G06F 30/23 |
| | | | | 703/1 |
| 2008/0056786 A1* | 3/2008 | Ishino | | G03G 21/0011 |
| | | | | 399/357 |
| 2009/0123731 A1* | 5/2009 | Shimizu | | C08J 3/005 |
| | | | | 428/323 |
| 2009/0198012 A1* | 8/2009 | Sakata | | C08L 63/00 |
| | | | | 524/606 |
| 2009/0234616 A1* | 9/2009 | Perkins | | G06Q 10/06 |
| | | | | 702/184 |
| 2010/0036618 A1* | 2/2010 | Mathews | | G01M 5/0066 |
| | | | | 702/35 |
| 2010/0049479 A1* | 2/2010 | Coles | | G06F 30/23 |
| | | | | 703/1 |
| 2011/0245999 A1* | 10/2011 | Kordonowy | | G05D 1/0066 |
| | | | | 701/3 |
| 2013/0216811 A1* | 8/2013 | Ghasemi-Nehjad | | |
| | | | | C04B 35/117 |
| | | | | 428/220 |
| 2013/0298690 A1* | 11/2013 | Bond | | G01M 7/08 |
| | | | | 73/788 |
| 2015/0088606 A1* | 3/2015 | Tyagi | | G06Q 30/0202 |
| | | | | 705/7.31 |
| 2016/0085892 A1* | 3/2016 | Coles | | G06F 30/15 |
| | | | | 703/8 |
| 2018/0244873 A1* | 8/2018 | Aerts | | B29C 70/025 |
| 2020/0047425 A1* | 2/2020 | Jahanbin | | B29C 66/43441 |
| 2020/0140629 A1* | 5/2020 | Aerts | | B32B 5/26 |
| 2021/0191381 A1* | 6/2021 | Bharadwaj | | B22F 10/20 |
| 2021/0233618 A1* | 7/2021 | Thompson-Colon | | |
| | | | | G16C 20/30 |

* cited by examiner

METHOD, SYSTEM AND APPARATUS FOR PREDICTING RESIDUAL STRENGTH OF COMPOSITE MATERIAL AFTER IMPACT, AND MEDIUM

TECHNICAL FIELD

The disclosure relates to a field of technologies for predicting a residual strength of a composite material, and particularly to a method, a system and an apparatus for predicting a residual strength of a composite material after impact, and a medium.

BACKGROUND

A fiber reinforced polymer (FRP) is widely applied in engineering design due to its high strength, low density, fatigue resistance and corrosion resistance. However, medium and low speed impacts such as gravel, hail and maintenance tool drop during service are prone to cause damages inside the FRP such as matrix cracking, delamination and fiber breakage. The impact damages are difficult to be recognized from the surface, however, they are likely to weaken strength and bearing capacity of a structure, which is a great potential safety hazard to in-service components. Therefore, it is particularly important to perform early prediction and tracking monitoring on the residual strength of a FRP after structural impact.

There are three categories of commonly used methods for predicting a residual strength of a composite material after impact. A first category is a numerical simulation method based on a finite element method, including a soft inclusion method, an opening method, a delamination pre-embedded method, a damage evolution method, etc.; a second category is an empirical formula prediction method based on a large number of destructive strength tests; and a third category is a residual strength prediction method based on a residual rigidity.

1) The soft inclusion method, the opening method and the delamination pre-embedded method first determine the size and the position of the damage through a conventional non-destructive testing technology such as ultrasonic scanning or X-ray, then consider the influences of impact damage on the structure through simplified means of reducing material parameters in the damage area, excavating units in the damage area and presetting delamination damage, and further determine the residual strength of the simplified impact damage model according to the damage criterion and the damage evolution model. The advantage of the category of method is that impact damage is simple in form, which facilitates subsequent residual strength analysis. The disadvantage of the method is that the position and the size of impact damage need to be determined by a conventional non-destructive testing means to predict a residual strength, which is not applicable to a structure in service.

2) The damage evolution method firstly conducts a finite element analysis according to the failure analysis and the damage evolution model to obtain impact damage according to the set impact energy, shape and quality of the impact object and then performs a residual strength analysis on the structure containing impact damage. The advantage of the method relies on that the impact damage is not required to be simplified and the residual strength calculation error caused by the simplification of the impact damage is reduced as much as possible, and the disadvantage is that: ① the impact energy, the shape and quality of the impact object must be known to determine the impact damage and the residual strength after damage, however, in fact, the impact energy, specific shape and quality of the impact object such as a bird, a hail, etc. are difficult to be tested online; ② calculation time is long, and the method is not applicable to an online monitoring task requiring rapid evaluation of the residual strength.

3) The empirical formula prediction method firstly needs to conduct a large number of destructive strength tests, determine a relationship between input parameters such as impact energy and a residual strength after structural impact by a fitting method, and finally propose an empirical formula of residual strength prediction after related impact. The advantage of the method is that the required parameters are input so as to rapidly predict a residual strength, which is a method with the highest prediction efficiency in the above methods. The disadvantage is that ① the related information of the impact event such as impact energy needs to be known in advance, and the information is difficult to be obtained online; ② a large number of destructive tests are needed to determine an empirical formula of residual strength prediction, with high economic cost.

4) The residual strength prediction method based on a residual rigidity mainly obtains a rigidity after structural impact by performing human loading on the test piece after impact, and determines a residual strength after impact according to the relationship between a residual rigidity and a residual strength. The advantage is that the relationship between the residual strength and the residual rigidity may be determined only by performing a small number of destructive tests without detection or hypothesis of damage. Since a rigidity test does not need to destruct a test piece, a strength may be tested frequently by testing a rigidity. The disadvantage is that a rigidity test needs manual loading and is still difficult for a structure in service to conduct a rigidity test.

In summary, the current method for predicting a residual strength may not be applied to monitoring a residual strength of the composite material in service.

SUMMARY

The present disclosure is intended to solve one of technical problems existing in the related art to at least certain extent.

Therefore, one purpose of embodiments of the present disclosure is to provide a method for predicting a residual strength of a composite material after impact. In the method, a modal test may be conducted on a composite material in service to obtain a real-time vibration frequency value. In combination with the initial frequency value of the composite material, a frequency change rate of the composite material before and after impact damage may be determined, and then the first frequency change rate is input to a pre-constructed residual strength prediction model to predict a residual strength of the composite material to be tested.

Another purpose of embodiments of the present disclosure is to provide a system for predicting a residual strength of a composite material after impact.

In order to achieve the above purpose, the technical solution in the embodiments include:

In a first aspect, the embodiments of the disclosure provide a method for predicting a residual strength of a composite material after impact. The method includes:

acquiring a first frequency value of a composite material to be tested after impact damage;

determining a first frequency change rate according to an initial frequency value and the first frequency value of the composite material to be tested;

inputting the first frequency change rate to a pre-constructed residual strength prediction model to predict a first residual strength of the composite material to be tested;

the first frequency value and the initial frequency value being obtained by a modal test.

Further, in one embodiment of the disclosure, the method for predicting a residual strength of a composite material after impact further includes blocks of constructing a residual strength prediction model. The blocks specifically include:

acquiring a first data set including a plurality of data groups, the data group including a second frequency change rate and a corresponding second residual strength;

denoising and thinning the first data set to obtain a training data set;

inputting the training data set to a deep neural network for training to obtain a trained residual strength prediction model.

Further, in one embodiment of the disclosure, the method for predicting a residual strength of a composite material after impact further includes blocks of constructing a residual strength prediction model. The blocks specifically include:

determining a function equation of the frequency change rate of the composite material to be tested and the residual strength, the function equation including a plurality of undetermined coefficients;

acquiring a first data set including a plurality of data groups, the data group including a second frequency change rate and a corresponding second residual strength;

fitting the first data set by a least square method, and determining undetermined coefficients of the function equation, thereby constructing a residual strength prediction model according to the function equation and the undetermined coefficients.

Further, in one embodiment of the disclosure, the function equation is:

$$S_d = [1 - C(1 - (1-\Delta f)^2)^w - r] \cdot S_0$$

$S_d$ represents the residual strength of the composite material to be tested, $\Delta_f$ represents the frequency change rate of the composite material to be tested, $S_0$ represents the initial strength of the composite material to be tested, and C, w, r are undetermined coefficients.

Further, in one embodiment of the disclosure, the blocks of acquiring a first data set specifically include:

conducting a modal test on a composite test piece by a vibration acquisition device to determine a second frequency value of the composite test piece without impact damage;

conducting an impact test of a preset strength on the composite test piece by an impact test device, and determining a third frequency value of the composite test piece after impact damage;

determining the second frequency change rate according to the second frequency value and the third frequency value;

conducting tensile, compression and bending strength tests on the composite test piece after impact damage to determine the second residual strength;

determining a data group according to the second frequency change rate and the second residual strength, thereby obtaining a first data set.

In a second aspect, the embodiments of the disclosure provide a system for predicting a residual strength of a composite material after impact. The system includes:

a first frequency value acquiring module, configured to acquire a first frequency value of a composite material to be tested after impact damage;

a frequency change rate determining module, configured to determine a first frequency change rate according to an initial frequency value and the first frequency value of the composite material to be tested;

a model prediction module, configured to input the first frequency change rate to a pre-constructed residual strength prediction model to predict a first residual strength of the composite material to be tested;

the first frequency value and the initial frequency value being obtained by a modal test.

Further, in one embodiment of the disclosure, the system for predicting a residual strength of a composite material after impact further includes a model construction module. The model construction module includes:

a first data set acquiring unit, configured to acquire a first data set including a plurality of data groups, the data group including a second frequency change rate and a corresponding second residual strength;

a training data set determining unit, configured to denoise and thin the first data set to obtain a training data set;

a model training unit, configured to input the training data set to a deep neural network for training to obtain a trained residual strength prediction model.

Further, in one embodiment of the disclosure, the system for predicting a residual strength of a composite material after impact further includes a model construction module. The model construction module includes:

a function equation determining unit, configured to determine a function equation of the frequency change rate of the composite material to be tested and the residual strength, the function equation including a plurality of undetermined coefficients;

a first data set acquiring unit, configured to acquire a first data set including a plurality of data groups, the data group including a second frequency change rate and a corresponding second residual strength;

a data fitting unit, configured to fit the first data set by a least square method and determine undetermined coefficients of the function equation, thereby constructing a residual strength prediction model according to the function equation and the undetermined coefficients.

In a third aspect, the embodiments of the disclosure provide an apparatus for predicting a residual strength of a composite material after impact. The apparatus includes:

at least one processor;

at least one memory configured to store at least one program;

the at least one program being executed by the at least one processor, the at least one processor being caused to execute the method for predicting a residual strength of a composite material after impact.

In a fourth aspect, the embodiments of the disclosure further provide a computer readable storage medium with programs executable by a processor, the programs executable by the processor being configured to execute the method for predicting a residual strength of a composite material after impact when executed by the processor.

Advantages and beneficial effects of the present disclosure will be set forth in part in the following description, and in part will become obvious from the following description, or may be learned by practice of the disclosure:

In embodiments of the disclosure, a modal test may be conducted on a composite material in service to obtain a real-time vibration frequency value, and in combination with the initial frequency value of the composite material, a frequency change rate of the composite material before and after impact damage may be determined, further the frequency change rate is input to a pre-constructed residual strength prediction model to predict a residual strength of the composite material to be tested. In embodiments of the disclosure, a residual strength may be predicted on the composite material in service without necessarily determining the position and the size of impact damage, the impact energy, the shape and quality of the impact object, which avoids a rigidity test on the composite material in service. Compared with the related art, the accuracy and the efficiency of predicting the residual strength of the composite material after impact are improved, and the application scope is wider.

BRIEF DESCRIPTION OF THE DRAWINGS

In order to explain the technical solutions in embodiments of the present disclosure more clearly, the figures described in the embodiments will be briefly introduced below. It should be noted that the figures described as below are only some embodiments of the present disclosure. Those skilled in the art may obtain other figures according to the figures without any creative work.

DETAILED DESCRIPTION

Embodiments of the present disclosure are described in detail below, and examples of embodiments are illustrated in the accompanying drawings, the same or similar labels representing the same or similar elements or elements with the same or similar functions. The embodiments described below with reference to the drawings are exemplary, and are intended to be configured to explain the present disclosure and are not to be construed as a limitation of the present disclosure. The block numbers in the following embodiments are set only for illustration, the sequence among blocks is not limited, and the execution sequence of the blocks in the embodiments may be adaptively adjusted according to the understanding of those skilled in the art.

In descriptions of the disclosure, a plurality of means two or more than two, and first, second are only for the purpose of distinguishing technical features and are not to be construed as indicating or implying relative importance or implicitly indicating the number of technical features indicated, or implicitly indicating the sequence of the indicated technical features. Further, unless otherwise defined, all technical and scientific terms used herein have the same meaning as commonly understood by those skilled in the art.

Figure 1:
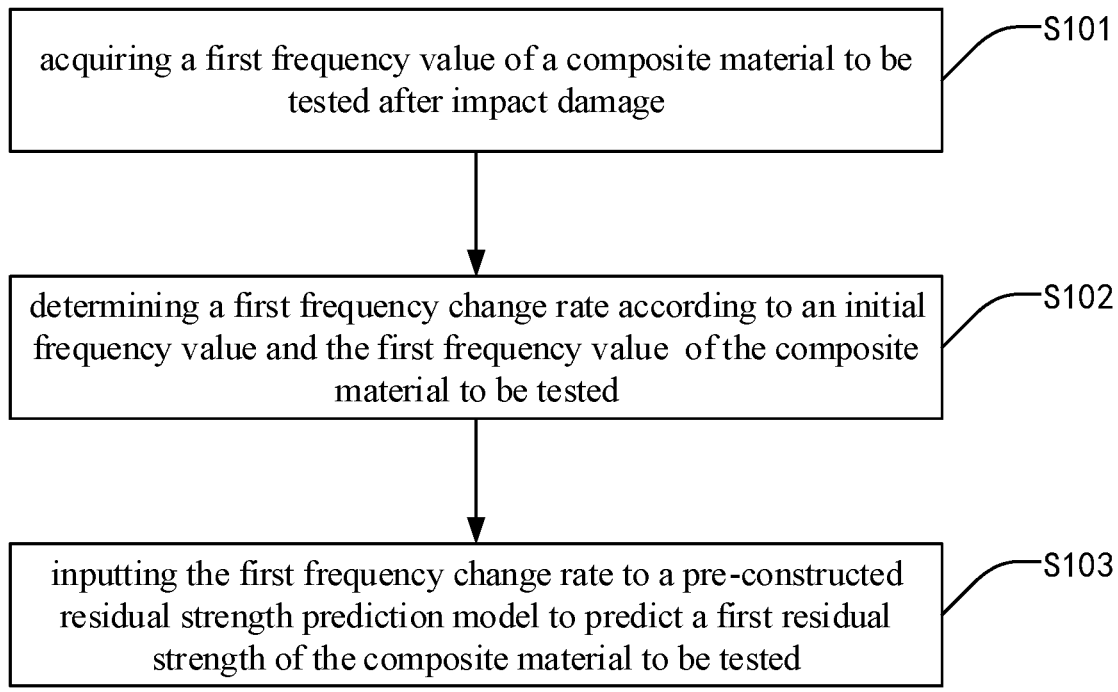
FIG. 1 is a flow diagram of blocks of a method for predicting a residual strength of a composite material after impact in embodiments of the disclosure.

Referring to FIG. 1, the, the embodiments of the disclosure provide a method for predicting a residual strength of a composite material after impact. The method includes:

at S101, a first frequency value of a composite material to be tested is acquired after impact damage;

at S102, a first frequency change rate is determined according to an initial frequency value and first frequency value of the composite material to be tested;

at S103, the first frequency change rate is input to a pre-constructed residual strength prediction model to predict a first residual strength of the composite material to be tested;

the first frequency value and initial frequency value are obtained by a modal test.

Specifically, a vibration signal acquisition device (such as an acceleration sensor, a laser scanning galvanometer, an FBG sensor, etc.) is configured to conduct a modal test on the composite structure in the initial state (not subject to impact damage) to obtain an initial frequency value of the composite structure; after the composite structure is subjected to impact damage, a modal test is conducted again to obtain a real-time vibration frequency value (i.e., a first frequency value) after impact damage of the composite material to be tested; the frequency change rate (i.e., a first frequency change rate) before and after impact damage of the composite material to be tested is obtained by calculation as follows:

$$\Delta f = \frac{(f_0 - f_d)}{f_0}$$

A first frequency change rate is input to a pre-constructed residual strength prediction model to predict a residual strength of the composite material.

There are two implementations for constructing a residual strength prediction model in embodiments of the disclosure described below correspondingly.

Further, as an alternative implementation, a method for predicting a residual strength of a composite material after impact further includes blocks of constructing a residual strength prediction model. The blocks specifically include:

at A1, a first data set including a plurality of data groups is acquired, the data group including a second frequency change rate and a corresponding second residual strength;

at A2, the first data set is denoised and thinned to obtain a training data set;

at A3, the training data set is input to a deep neural network for training to obtain a trained residual strength prediction model.

Specifically, for a first implementation of constructing a residual strength prediction model, a prediction model may be trained by machine learning based on the "frequency change rate-residual strength" data of the plurality of test pieces obtained by the test, with a frequency change rate as a prediction input and the residual strength after impact as an output. The trained residual strength prediction model may quickly predict a residual strength after structural impact according to the input frequency change rate of the composite structure.

It may be appreciated that for a residual strength prediction model, the accuracy of the prediction results may be measured by a loss function defined on single training data configured to measure a prediction error of one training data, specifically a loss value of the training data is determined by the prediction results of the training data through the label and model of the single training data. During actual training, a training data set has a large number of training data, therefore, a cost function is generally configured to measure a global error of a training data set, and the cost function defined on the entire training data set is configured to calculate an average value of the prediction error of all training data, so that the prediction effect of the model may be better measured. For a typical machine learning model, the above cost function plus a regularization term that measures the complexity of the model may be configured as a training objective function, and a loss value of the entire training data set may be solved based on the objective function. There are many commonly used loss functions, for example, a 0-1 loss function, a square loss function, an absolute loss function, a logarithmic loss function, a cross entropy loss function, etc. are loss functions of a machine learning model, which will not be repeated here. In embodiments of the disclosure, any one loss function may be selected to determine a training loss value. Based on the training loss value, a back propagation algorithm is adopted to update parameters of a model, and a trained residual strength prediction model may be obtained after several iterations. The number of iterations may be preset, or training is considered completed when the test set reaches the precision requirement. In embodiments of the disclosure, a residual strength prediction model may be trained based on a deep learning network.

Further, as an optional implementation, a method for predicting a residual strength of a composite material after impact further includes blocks of constructing a residual strength prediction model. The blocks specifically include:

at B1, a function equation of the frequency change rate of the composite material to be tested and the residual strength is determined, the function equation including a plurality of undetermined coefficients;

at B2, a first data set including a plurality of data groups is acquired, the data group including a second frequency change rate and a corresponding second residual strength;

at B3, a first data set is fitted by a least square method and undetermined coefficients of the function equation are determined, thereby constructing a residual strength prediction model according to the function equation and the undetermined coefficients.

Further, as an optional implementation, the function equation is:

$$S_d = [1 - C(1 - (1-\Delta f)^2)^w - r] \cdot S_0$$

$S_d$ represents the residual strength of the composite material to be tested, $\Delta_f$ represents the frequency change rate of the composite material to be tested, $S_0$ represents the initial strength of the composite material to be tested, and $C$, $w$, $r$ are undetermined coefficients.

Specifically, for a second implementation of constructing a residual strength prediction model, the above function equation of the frequency change rate after impact and the residual strength may be deduced according to the relationship between a rigidity and a frequency and the relationship between a residual rigidity and a residual strength; and based on the "frequency change rate-residual strength" data of the plurality of sets of test pieces obtained by the test, the initial strength of the composite material is determined by at least one set of non-destructive test pieces, and based on the at least three sets of "frequency change rate-residual strength" data, undetermined coefficients C, w, r of the function equation are determined by a least square method, and then a residual strength prediction model is constructed according to the function equation and the undetermined coefficients, and the frequency change rate is input to the residual strength prediction model, so that the residual strength may be quickly predicted.

The above two implementations for constructing a residual strength prediction model needs to acquire a plurality of sets of "frequency change rate–residual strength" data (that is, a first data set) in advance by a test.

Further, as an optional implementation, the blocks of acquiring a first data set specifically includes:

at C1: a modal test is conducted on a composite test piece by a vibration acquisition device to determine a second frequency value of the composite test piece without impact damage;

at C2: an impact test of a preset strength is conducted on the composite test piece by an impact test device, and a third frequency value of the composite test piece after impact damage is determined;

at C3: the second frequency change rate is determined according to the second frequency value and the third frequency value;

at C4: tensile, compression and bending strength tests are conducted on the composite test piece after impact damage to determine a second residual strength;

at C5: a data group is determined according to the second frequency change rate and the second residual strength, thereby obtaining a first data set.

Specifically, the composite test piece is a test piece with the same structure of a composite material to be tested. A vibration frequency value and a residual strength are tested after different strengths of impact tests are conducted on the test piece to obtain a plurality of sets of "frequency change rate–residual strength" data, thereby obtaining a first data set. The impact test device may be a falling weight impact tester, a Hopkinson bar, etc.

It may be understood that a second frequency value (an initial frequency value of the composite test piece) in the embodiment of the disclosure is theoretically equal to the initial frequency value of the composite material to be tested, and the measured second frequency value may also be directly configured as an initial frequency value of the composite material to be tested for subsequent calculation.

The blocks of the embodiments of the disclosure are described above. In embodiments of the disclosure, a residual strength prediction may be performed on the composite material in service without necessarily determining the position and the size of impact damage, the impact energy, the shape and quality of the impact object, which avoids a rigidity test of the composite material in service. Compared with the related art, the accuracy and the efficiency of predicting the residual strength of the composite material after impact is improved, and the application scope is wider.

It should be appreciated that the embodiments of the disclosure firstly propose that a residual strength after impact is predicted based on the frequency change rate before and after impact of the composite material, and a modal test is conducted on the composite material in service to acquire a frequency of the composite material without damaging the composite material, so that the embodiments of the disclosure may be applied to a composite material in service. There are the following advantages compared with the related art:

1) a residual strength of a composite material after impact is predicted by a frequency change rate by acquiring a frequency only by a simple vibration acquisition device, thereby predicting a residual strength after impact, easy to operate;

2) a frequency may be tested when the composite structure is in a service state without interfering with the actual use of the composite structure, the method belonging to an advanced technology for online prediction of a residual strength after impact;

3) compared with the conventional method for predicting a residual strength based on the opening method, the soft inclusion method and the delamination pre-embedded method, the advantage of the method is that the position and the size of impact damage are not necessarily determined, with a wider application;

4) compared with the conventional method for predicting a residual strength based on the damage evolution method, the advantage of the method is that the impact energy, the shape and quality of the impact object are not necessarily determined, with a wider application; in addition, a time-consuming finite element calculation is not needed, with a higher prediction efficiency.

5) compared with the conventional method for predicting a residual strength based on the empirical formula method, the advantage of the method is that the related information of the impact event is not necessarily acquired, with a wider application;

6) compared with the conventional method for predicting a residual strength based on a residual rigidity, the advantage of the method is that manual loading is not needed on the composite material to be tested, and damage on the composite material to be tested is avoided.

The prediction results of the embodiments of the present disclosure are described below in connection with specific tests.

Impact tests, vibration tests before and after impact and strength tests after impact are conducted on a composite beam test piece and a composite plate test piece respectively, and test data is processed according to the blocks of embodiments of the disclosure, to obtain a prediction result of a residual strength after impact. The relevant descriptions are as follows:

1. Test process: vibration tests are conducted first on a composite beam and a plate test piece in an initial state (using a laser scanning galvanometer SLLDV) to obtain an initial frequency value, and impact tests with different energies are conducted on the composite test piece (using an Instron 9350 falling weight impact tester), and a frequency is acquired by a laser scanning galvanometer after impact, and finally a three-point bending strength test is conducted on the beam test piece after impact to obtain a residual bending strength of the composite beam test piece, and a compression strength test is conducted on the impact composite plate test piece to obtain a residual compression strength of the plate. Thus, a series of "frequency change rate-residual strength" data groups are obtained, and in combination with two implementations of constructing a residual strength prediction model, a residual strength prediction model based on a function relationship and a residual strength prediction model based on machine learning are obtained. According to two residual strength prediction models, residual strengths of all test pieces after impact are predicted in combination with a frequency change rate.

2. Residual strength prediction results of a composite beam test piece after impact:

(1) Prediction results of a residual strength prediction model based on a function relationship: the 1st-order and 2nd-order frequency measurements in the modal test are greatly affected by the test environment, and the frequency error is large, therefore, a residual strength may be predicted primarily by a mode after a 3rd-order mode. 7-order frequency values are measured for a composite beam test piece, a frequency change rate from a 3rd order to a 7th order is configured as an input, and an average frequency change rate from a 3rd order to a 7th order is configured as a residual strength prediction result of an input as illustrated in Table 1 below. It can be seen that a prediction error and a standard deviation of an average input scheme from the 3rd order to the 7th order (AVG 3-7) are the minimum in all prediction schemes, a prediction error being 1.32%, a standard deviation being 0.88%, a maximum error being 2.85%; a prediction error less than 2.8% and a maximum error less than 8.5% in all other five schemes, indicating that a residual strength of a composite beam test piece may be predicted by using different frequency change rate input schemes.

TABLE 1

| Scheme Name | Scheme Type | Prediction Error | Standard Deviation | Maximum Error |
|---|---|---|---|---|
| Mode 3 | Single Order | 2.06% | 1.32% | 4.17% |
| Mode 4 | Single Order | 1.67% | 1.25% | 3.80% |
| Mode 5 | Single Order | 1.88% | 1.69% | 5.48% |
| Mode 6 | Single Order | 1.33% | 1.67% | 3.88% |
| Mode 7 | Single Order | 2.78% | 2.54% | 8.16% |
| AVG 3-7 | Multi-Order Average | 1.32% | 0.88% | 2.85% |

Prediction results of a residual strength prediction model based on machine learning: in addition to taking a frequency change rate from a 3rd order to a 7th order as an input and an average frequency change rate from a 3rd order to a 7th order as a residual strength prediction result of an input, a machine learning algorithm may process multiple input problems, therefore, a residual strength prediction result in various input schemes are as illustrated in Table 2. It can be seen that a prediction error and a standard deviation of an average input scheme from the 3rd order to the 7th order (AVG 3-7) are the minimum in all prediction schemes, a prediction error being 1.03%, a standard deviation being 1.00%, a maximum error being 2.97%; a prediction error less than 7.5% and a maximum error less than 15% in all other five schemes, indicating that a residual strength of a composite beam test piece may be predicted by using different frequency change rate input schemes.

TABLE 2

| Scheme Name | Scheme Type | Prediction Error | Standard Deviation | Maximum Error |
|---|---|---|---|---|
| Mode 3 | Single Order | 5.21% | 5.73% | 12.87% |
| Mode 4 | Single Order | 2.53% | 3.18% | 7.83% |
| Mode 5 | Single Order | 3.06% | 3.58% | 7.35% |
| Mode 6 | Single Order | 7.34% | 4.98% | 12.98% |
| Mode 7 | Single Order | 5.81% | 6.36% | 14.61% |
| AVG 3-7 | Multi-Order Average | 1.03% | 1.00% | 2.97% |
| Mode 3- Mode 7 | Multi-Order | 5.02% | 3.01% | 10.02% |

3. Residual strength prediction results of a composite beam test plate after impact:

(1) Prediction results of a residual strength prediction model based on a function relationship: 6-order frequency values are measured for a composite beam test plate. The 1st-order and 2nd-order frequency measurements in the modal test are greatly affected by the test environment, and the frequency error is large, therefore, a residual strength may be predicted primarily by mode after a 3rd-order mode. Since the frequency change rate input to a theoretical model must be positive, only the 3rd order, the 5th order, the 6th order single-order input schemes and the average frequency change rate input scheme from the 3rd-order to the 6th-order with a positive frequency change rate are considered, and the residual strength prediction results are illustrated in Table 3. A prediction error and a standard deviation of an average input scheme from the 3rd order to the 6th order (AVG 3-6)

are the minimum in all prediction schemes, a prediction error being 1.50%, a standard deviation being 1.93%, a maximum error being 6.52%; a prediction error less than 4% and a maximum error less than 15% in all other three schemes, indicating that a residual strength of a composite plate test piece may be predicted by using different frequency change rate input schemes.

TABLE 3

| Scheme Name | Scheme Type | Prediction Error | Standard Deviation | Maximum Error |
|---|---|---|---|---|
| Mode 3 | Single Order | 1.83% | 1.37% | 3.98% |
| Mode 5 | Single Order | 2.60% | 3.96% | 14.25% |
| Mode 6 | Single Order | 2.08% | 1.28% | 4.00% |
| AVG 3-6 | Multi-Order Average | 1.50% | 1.93% | 6.52% |

(2) Prediction results of a residual strength prediction model based on machine learning: since the frequency change rate input to a theoretical model may be negative, in addition to taking the 3rd order, the 5th order, the 6th order single-order input schemes as inputs, a 4th order may be attempted to be an input, and a multi-order input scheme and a multi-order average input scheme are considered, and the residual strength prediction results are illustrated in Table 4. A prediction error and a standard deviation of an average input scheme from the 3rd order to the 6th order (AVG 3-6) are the minimum in all prediction schemes, an error being 1.25%, a standard deviation being 0.91%, a maximum error being 3.01%; a prediction error less than 3% and a maximum error less than 15% in all other five schemes, indicating that a residual strength of a composite plate test piece may be predicted by using different frequency change rate input schemes.

TABLE 4

| Scheme Name | Scheme Type | Prediction Error | Standard Deviation | Maximum Error |
|---|---|---|---|---|
| Mode 3 | Single Order | 1.76% | 1.48% | 4.57% |
| Mode 4 | Single Order | 2.73% | 1.51% | 6.04% |
| Mode 5 | Single Order | 3.00% | 4.19% | 14.48% |
| Mode 6 | Single Order | 2.29% | 1.67% | 4.95% |
| AVG 3-6 | Multi-Order Average | 1.25% | 0.91% | 3.01% |
| Mode 3-Mode 6 | Multi-Order | 1.67% | 1.90% | 4.74% |

Figure 2:
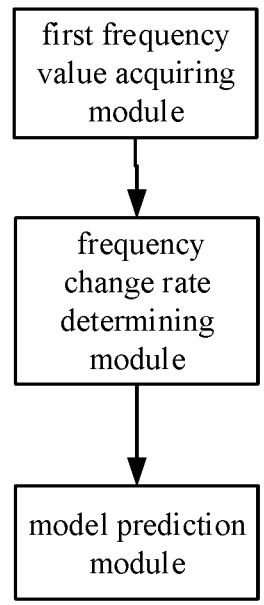
FIG. 2 is a block diagram of a structure of a system for predicting a residual strength of a composite material after impact in embodiments of the disclosure.

Referring to FIG. 2, the, the embodiments of the disclosure provide a system for predicting a residual strength of a composite material after impact. The system includes:

a first frequency value acquiring module, configured to acquire a first frequency value of a composite material to be tested after impact damage;

a frequency change rate determining module, configured to determine a first frequency change rate according to an initial frequency value and first frequency value of the composite material to be tested;

a model prediction module, configured to input a first frequency change rate to a pre-constructed residual strength prediction model to predict a first residual strength of the composite material to be tested;

the first frequency value and initial frequency value is obtained by a modal test.

Further, in at least one embodiment, a system for predicting a residual strength of a composite material after impact further includes a model construction module. The model construction module includes:

a first data set acquiring unit, configured to acquire a first data set including a plurality of data groups, the data group including a second frequency change rate and a corresponding second residual strength;

a training data set determining unit, configured to denoise and thin the first data set to obtain a training data set;

a model training unit, configured to input the training data set to a deep neural network for training to obtain a trained residual strength prediction model.

Further, in an optional implementation, a system for predicting a residual strength of a composite material after impact further includes a model construction module. The model construction module includes:

a function equation determining unit, configured to determine a function equation of the frequency change rate of the composite material to be tested and the residual strength, the function equation including a plurality of undetermined coefficients;

a first data set acquiring unit, configured to acquire a first data set including a plurality of data groups, the data group including a second frequency change rate and a corresponding second residual strength;

a data fitting unit, configured to fit the first data set by a least square method and determine undetermined coefficients of the function equation, thereby constructing a residual strength prediction model according to function equation and the undetermined coefficients.

The contents of the above method embodiments are applied to the system embodiments. The functions embodied in the system embodiments are the same as the functions of the above method embodiments, and the beneficial effects achieved are the same as the beneficial effects achieved by the above method embodiments.

Figure 3:
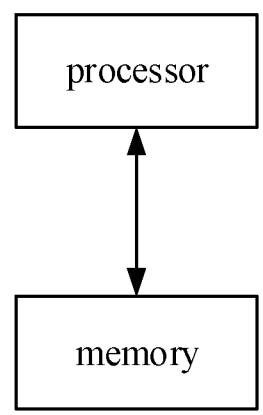
FIG. 3 is a block diagram of a structure of an apparatus for predicting a residual strength of a composite material after impact in embodiments of the disclosure.

Referring to FIG. 3, the embodiments of the disclosure provide an apparatus for predicting a residual strength of a composite material after impact. The apparatus includes:

at least one processor;

at least one memory configured to store at least one program;

the at least one program being executed by the at least one processor, the at least one processor being caused to execute the method for predicting a residual strength of a composite material after impact.

The contents of the above method embodiments are applied to the apparatus embodiments. The functions embodied in the apparatus embodiments are the same as the functions of the above method embodiments, and the beneficial effects achieved are the same as the beneficial effects achieved by the above method embodiments.

The embodiments of the disclosure further provide a computer readable storage medium with programs executable by a processor, the programs executable by the processor being configured to execute the method for predicting a residual strength composite material after impact when executed by the processor.

A computer-readable storage medium in embodiments of the disclosure may execute a method for predicting a residual strength of one composite material after impact in the method embodiments and any combination of blocks of the method embodiment, with corresponding functions and benefits of the method.

Embodiments of the disclosure further disclose a computer program product or a computer program including computer instructions stored in a computer readable storage medium. The processor of the computer device may read computer instructions from the computer-readable storage medium and executes the computer instructions so that the computer device performs the method illustrated in FIG. 1.

In some optional embodiments, functions/operations referred to in block diagrams may occur not in accordance with sequence in the diagrams. For example, two blocks shown in succession may be executed substantially concurrently or sometimes may be executed in the reverse sequence, depending on functions/operations involved. In addition, the embodiments presented and described in the flowcharts of the present disclosure are provided by way of examples, and are intended to provide a more thorough understanding of the technology. The disclosed methods are not limited to operations and logic flows presented herein. Alternative embodiments are predictable. The sequence of various operations is changed and sub-operations described as a part of a larger operation are independently executed.

In addition, even though the disclosure is described in the context of a functional module, it should be understood that one or more of the above functions and/or features may be integrated in a single physical unit and/or software module, or one or more functions and/or features may be implemented in a separate physical device or software module, unless otherwise indicated. It may be further understood that the detailed discussion regarding the actual implementation of each module is not necessary for understanding the disclosure. More specifically, in consideration of attributes, functions and internal relationships of various functional modules in the apparatus disclosed herein, the actual implementation of the module may be understood by those skilled in the art. Accordingly, the disclosure as set forth in the claims may be implemented without undue tests by those skilled in the art. It may be further understood that specific concepts disclosed are illustrative only and are not intended to limit the scope of the disclosure defined by the appended claims and their entire scope of equivalents.

The above functions may be stored in a computer readable memory if it is implemented in the form of a software function unit and sold and used as an independent product, which may be stored in a computer readable storage medium. On the basis of such an understanding, the technical solution of the present disclosure essentially or partly contributing to the related art, or part of the technical solution may be embodied in the form of a software product. The software product including several instructions is stored in a storage medium, so that a computer device (may be a personal computer, a server or a network device, etc.) executes all or part of blocks of various embodiments of the present disclosure. The medium includes a USB disk, a mobile hard disk, a read-only memory (ROM), a random access memory (RAM), a magnetic disk or an optical disk, and other media that may store program codes.

The logics and/or blocks represented in the flowchart or described in other ways herein, for example, may be considered as an ordered list of executable instructions configured to implement logic functions, which may be specifically implemented in any computer readable medium for use by instruction execution systems, apparatuses or devices (such as a computer-based system, a system including a processor, or other systems that may obtain and execute instructions from an instruction execution system, an apparatus or a device) or in combination with the instruction execution systems, apparatuses or devices. A "computer readable medium" in the specification may be an apparatus that may contain, store, communicate, propagate or transmit a program for use by instruction execution systems, apparatuses or devices or in combination with the instruction execution systems, apparatuses or devices.

A more specific example (a non-exhaustive list) of a computer readable medium includes the followings: an electronic connector (an electronic apparatus) with one or more cables, a portable computer disk box (a magnetic device), a random access memory (RAM), a read-only memory (ROM), an erasable programmable read-only memory (an EPROM or a flash memory), an optical fiber device, and a portable optical disk read-only memory (CDROM). In addition, a computer readable medium even may be paper or other suitable medium on which a program may be printed, since paper or other medium may be optically scanned, and then edited, interpreted or processed in other suitable ways if necessary to obtain a program electronically and store it in a computer memory.

It should be understood that all parts of the present disclosure may be implemented with a hardware, a software, a firmware and their combination. In the above implementation, multiple blocks or methods may be stored in a memory and implemented by a software or a firmware executed by a suitable instruction execution system. For example, if implemented with a hardware, they may be implemented by any of the following technologies or their combinations known in the art as in another implementation: a discrete logic circuit with logic gate circuits configured to achieve logic functions on data signals, a special integrated circuit with appropriate combined logic gate circuits, a programmable gate array (PGA), a field programmable gate array (FPGA), etc.

In the above descriptions, descriptions with reference to terms "one implementation/embodiment", "another implementation/embodiment" or "some implementations/embodiments", etc. mean specific features, structures, materials or characteristics described in combination with the implementation or example are included in at least one implementation or example of the present disclosure. The schematic representations of the above terms do not have to be the same implementation or example. Moreover, specific features, structures, materials or characteristics described may be combined in any one or more implementations or examples in a suitable manner.

Even though implementations of the disclosure have been illustrated and described, it may be understood by those skilled in the art that various changes, modifications, substitutions and alterations may be made for these implementations without departing from the principles and spirit of the disclosure, and the scope of the disclosure is defined by claims and their equivalents. Although the preferred embodiments have been described in detail, the embodiments are not limited in the disclosure. Those skilled in the art know that various equivalent modifications or substitutions may be made without departing from the spirit of the disclosure, and all of these equivalent modifications or substitutions are intended to be included within the scope defined by the claims of the present disclosure.

What is claimed:
1. A method for predicting a residual strength of a composite material after impact, comprising:
   acquiring a first vibration frequency value of a composite material to be tested after impact damage;
   determining a first vibration frequency change rate according to an initial vibration frequency value and the first vibration frequency value of the composite material to be tested;

inputting the first vibration frequency change rate to a pre-constructed residual strength prediction model to predict a first residual strength of the composite material to be tested;

wherein, the first vibration frequency value and the initial vibration frequency value being obtained by a modal test.

2. The method of claim 1, wherein, further comprising constructing a residual strength prediction model, specifically comprising:

acquiring a first data set comprising a plurality of data groups, the data group comprising a second vibration frequency change rate and a corresponding second residual strength;

denoising and thinning the first data set to obtain a training data set;

inputting the training data set to a deep neural network for training to obtain a trained residual strength prediction model.

3. The method of claim 2, wherein, acquiring a first data set, specifically comprising:

conducting a modal test on a composite test piece by a vibration acquisition device to determine a second vibration frequency value of the composite test piece without impact damage;

conducting an impact test of a preset strength on the composite test piece by an impact test device, and determining a third vibration frequency value of the composite test piece after impact damage;

determining the second vibration frequency change rate according to the second vibration frequency value and the third vibration frequency value;

conducting tensile, compression and bending strength tests on the composite test piece after impact damage to determine the second residual strength;

determining a data group according to the second vibration frequency change rate and the second residual strength, thereby obtaining a first data set.

4. The method of claim 1, wherein, further comprising constructing a residual strength prediction model, specifically comprising:

determining a function equation of the vibration frequency change rate of the composite material to be tested and the residual strength, the function equation comprising a plurality of undetermined coefficients;

acquiring a first data set comprising a plurality of data groups, the data group comprising a second vibration frequency change rate and a corresponding second residual strength;

fitting the first data set by a least square method, and determining undetermined coefficients of the function equation, thereby constructing a residual strength prediction model according to the function equation and the undetermined coefficients.

5. The method of claim 4, wherein, the function equation being:

$$S_d = [1 - C(1-(1-\Delta f)^2)^w - r] \cdot S_0$$

wherein, $S_d$ representing the residual strength of the composite material to be tested, $\Delta f$ representing the vibration frequency change rate of the composite material to be tested, $S_0$ representing the initial strength of the composite material to be tested, and C, w, r being undetermined coefficients.

6. A system for predicting a residual strength of a composite material after impact, comprising:

a first vibration frequency value acquiring module, configured to acquire a first vibration frequency value of a composite material to be tested after impact damage;

a vibration frequency change rate determining module, configured to determine a first vibration frequency change rate according to an initial vibration frequency value and the first vibration frequency value of the composite material to be tested;

a model prediction module, configured to input the first vibration frequency change rate to a pre-constructed residual strength prediction model to predict a first residual strength of the composite material to be tested;

wherein, the first vibration frequency value and the initial vibration frequency value being obtained by a modal test.

7. The system of claim 6, wherein, further comprising a model construction module, the model construction module comprising:

a first data set acquiring unit, configured to acquire a first data set comprising a plurality of data groups, the data group comprising a second vibration frequency change rate and a corresponding second residual strength;

a training data set determining unit, configured to denoise and thin the first data set to obtain a training data set;

a model training unit, configured to input the training data set to a deep neural network for training to obtain a trained residual strength prediction model.

8. The system of claim 6, wherein, further comprising a model construction module, the model construction module comprising:

a function equation determining unit, configured to determine a function equation of the vibration frequency change rate of the composite material to be tested and the residual strength, the function equation comprising a plurality of undetermined coefficients;

a first data set acquiring unit, configured to acquire a first data set comprising a plurality of data groups, the data group comprising a second vibration frequency change rate and a corresponding second residual strength;

a data fitting unit, configured to fit the first data set by a least square method and determine undetermined coefficients of the function equation, thereby constructing a residual strength prediction model according to the function equation and the undetermined coefficients.

\* \* \* \* \*